US007865695B2

(12) United States Patent
Yancey et al.

(10) Patent No.: US 7,865,695 B2
(45) Date of Patent: Jan. 4, 2011

(54) READING AND WRITING A MEMORY ELEMENT WITHIN A PROGRAMMABLE PROCESSING ELEMENT IN A PLURALITY OF MODES

(75) Inventors: Jerry William Yancey, Rockwall, TX (US); Yea Zong Kuo, Rockwall, TX (US)

(73) Assignee: L3 Communications Integrated Systems, L.P., Greenville, TX (US)

( * ) Notice: Subject to any disclaimer, the term of this patent is extended or adjusted under 35 U.S.C. 154(b) by 369 days.

(21) Appl. No.: 11/737,614

(22) Filed: Apr. 19, 2007

(65) Prior Publication Data

US 2008/0263317 A1 Oct. 23, 2008

(51) Int. Cl.
*G06F 15/76* (2006.01)
(52) U.S. Cl. ....................................................... 712/11
(58) Field of Classification Search ..................... 712/11
See application file for complete search history.

(56) References Cited

U.S. PATENT DOCUMENTS

| | | | |
|---|---|---|---|
| 4,447,881 A | 5/1984 | Brantingham et al. | |
| 5,081,575 A | 1/1992 | Hiller et al. | |
| 5,465,056 A | 11/1995 | Hsieh et al. | |
| 5,619,713 A | 4/1997 | Baum et al. | |
| 5,892,962 A * | 4/1999 | Cloutier ........................ | 712/16 |
| 6,000,024 A * | 12/1999 | Maddox ........................ | 712/11 |
| 6,145,072 A * | 11/2000 | Shams et al. ................... | 712/22 |
| 6,567,563 B2 | 5/2003 | Shin | |
| 7,047,464 B2 | 5/2006 | Bailis et al. | |
| 7,064,579 B2 | 6/2006 | Madurawe | |
| 7,076,595 B1 | 7/2006 | Dao et al. | |

* cited by examiner

*Primary Examiner*—Eddie P Chan
*Assistant Examiner*—Jacob Petranek
(74) *Attorney, Agent, or Firm*—Hovey Williams LLP

(57) ABSTRACT

An integrated circuit in communication with a host circuit includes an interconnect bus and a plurality of programmable elements. Each of the programmable elements includes a control interface for receiving a control signal, the control signal causing the memory element to selectively operate in one of a plurality of modes. In a first mode, the memory element communicates stored data to the output port upon receiving the control signal; in a second mode the memory element communicates stored data to the output port upon detecting valid data at the input port; in a third mode the memory element stores a first data value consisting of at least a portion of a single data word received at the input port; and in a fourth mode the memory element stores a second data value consisting of at least a portion of each of two separate input values received at the input port. Each programmable element may write data to and read data from a memory element of any of the other programmable elements.

5 Claims, 9 Drawing Sheets

| PCPS x (PMEDS Stage x) | 0 | 1 |
|---|---|---|
| Sources | | |
| Stage x Input Signal | 0 | 1 |
| Stage x Interpolator | 0 | 1 |
| Stage x AU Output | 0 | 1 |
| Stage x Divider Output | 0 | |
| Stage x MAC Output | 0 | 1 |
| SP0 Read Port x | 0 | 1 |
| SP1 Read Port | | |
| Inter-Pair Input from Stage x | 1 | 0 |
| Stage x Ray 0, 1 Output | 0 | 1 |
| Stage x Constant | 0 | 1 |
| Destinations | | |
| Stage x AU Input 0 | 0 | 1 |
| Stage x AU Input 1 | 0 | 1 |
| Stage x Divider Input 0 | 0 | |
| Stage x Divider Input 1 | 0 | |
| Stage x MAC Input 0 | 0 | 1 |
| Stage x MAC Input 1 | 0 | 1 |
| SP0 Write Port x | 0 | 1 |
| SP1 Write Port x | | |
| Inter-Pair Output from Stage x | 1 | 0 |
| Stage x Ray 0, 1 Input | 0 | 1 |
| Stage x Output | 0 | 1 |

FIG. 5

READING AND WRITING A MEMORY ELEMENT WITHIN A PROGRAMMABLE PROCESSING ELEMENT IN A PLURALITY OF MODES

RELATED APPLICATIONS

The present application is related to co-pending U.S. Patent Application titled "CPU DATAPIPE ARCHITECTURE WITH CROSSPOINT SWITCH," Ser. No. 11/322,487, filed Dec. 30, 2005. The identified earlier-filed application is hereby incorporated by reference into the present application.

BACKGROUND

1. Field

This invention relates generally to a central processing unit ("CPU") architecture. More particularly, this invention relates to a reconfigurable CPU within an Application Specific Integrated Circuit ("ASIC").

2. Description of Related Art

Large-scale (multi-million gate) application specific integrated circuit ("ASIC") designs are hampered by many logistical problems. Many of these problems are related to the functional integration, timing, reprogramming and testing of various ASIC sub-modules. If sub-module design changes or replacements are required to remedy top-level operational issues, or to provide differing functional capabilities, costly delays and recursive design changes can result. Design changes of this nature drive up engineering, manufacturing and test costs for ASIC manufacturers, and limit the applicability of a given ASIC design.

Stated differently, ASIC designs typically have limited reconfigurability at the module or sub-module level, which is to say they may be programmable via control registers, but they typically use fixed architectures. These fixed architectures do not allow for functional modules to be re-arranged or reconfigured by a user. Certain ASICs, such as field programmable gate arrays ("FPGAs"), permit the user to reconfigure or reprogram functional modules, however, they are an extreme example which require a great deal of specialized programming and a special, fine-grained ASIC architecture to implement.

Within the current state of the art for ASIC design, manufacture, and test, there does not exist a processing unit or means for efficiently and quickly reprogramming functional modules. Hence there is a need for an advanced ASIC processing architecture to address one or more of the drawbacks identified above.

SUMMARY OF THE INVENTION

An improved datapipe destination and source device is part of a programmable element of an integrated circuit that is in communication with a host that is external to the integrated circuit. The integrated circuit includes an interconnect bus and a plurality of programmable elements, each element including a memory element, a first port for communicating data from the memory element to the interconnect bus, a second port for communicating data from the interconnect bus to the memory element, and a host interface for receiving a control signal from the host circuit, the control signal directing operation of the memory element.

The control signal may cause the memory element to selectively operate in one of a plurality of modes. In a first mode, the memory element communicates stored data to the first port upon receiving the control signal. In a second mode, the memory element communicates stored data to the first port upon detecting valid data at the second port. In a third mode, the memory element stores a first data value consisting of at least a portion of a single data word received at the second port. In a fourth mode, the memory element stores a second data value consisting of at least a portion of each of two sequentially separate data words received at the second port.

These and other important aspects of the present invention are described more fully in the detailed description below.

BRIEF DESCRIPTION OF THE DRAWINGS

An embodiment of the present invention is described in detail below with reference to the attached drawing figures, wherein:

FIG. 5 is a matrix of crosspoint switch sources and destinations;

DETAILED DESCRIPTION

Before proceeding with the detailed description, it should be noted that the present teaching is by way of example, not by limitation. The concepts herein are not limited to use or application with one specific type of central processing architecture. Thus, although the instrumentalities described herein are for the convenience of explanation, shown and described with respect to exemplary embodiments, the principles herein may be equally applied in other types of central processing architectures.

Figure 1:
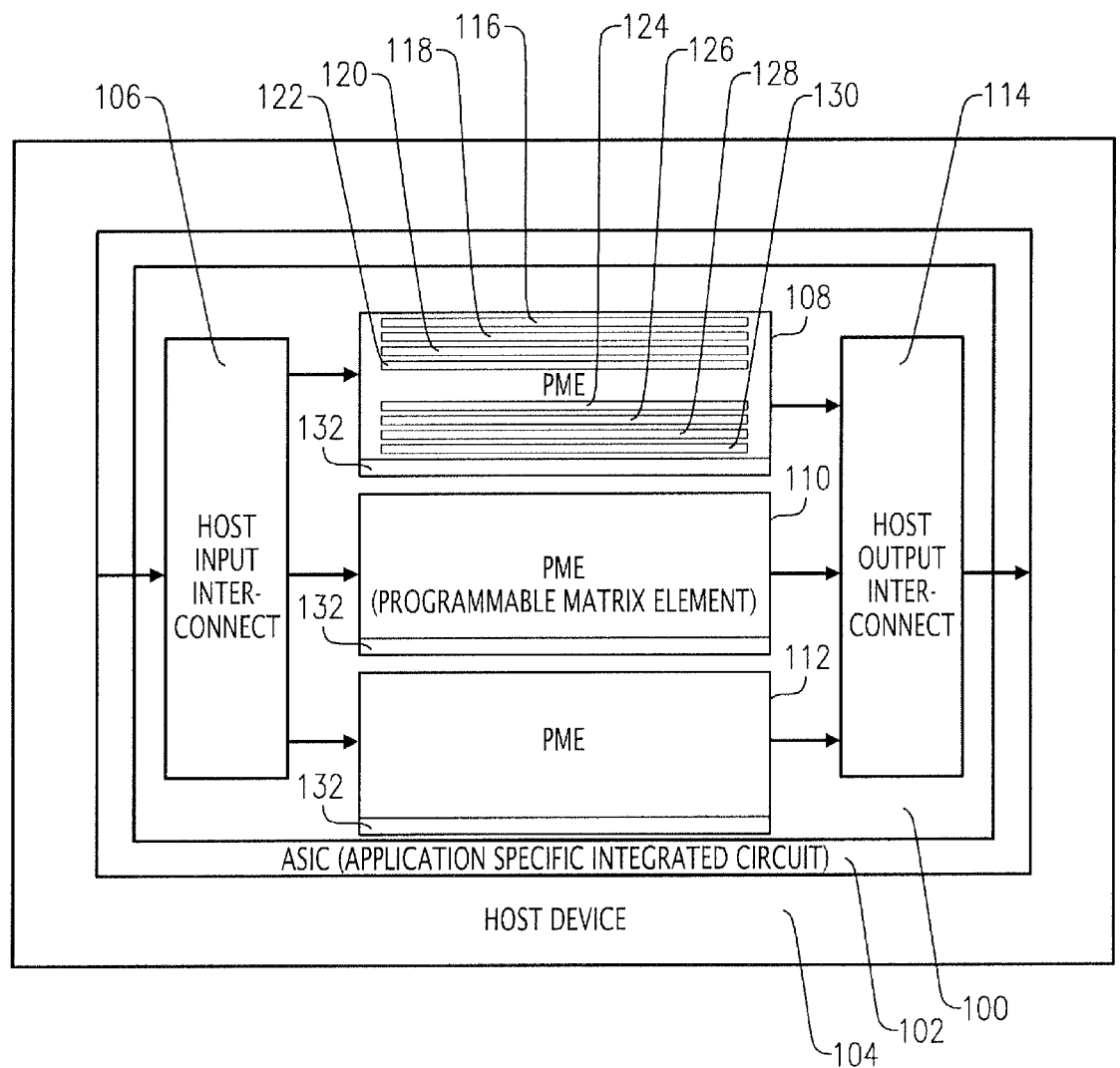
FIG. 1 is a plan view of a processing unit having a plurality of integrated programmable elements.

FIG. 1 is a plan view of a reconfigurable processing unit 100 for an application specific integrated circuit ("ASIC") 102. In at least one embodiment, the processing unit is a central processing unit ("CPU"). As shown, ASIC 102 interfaces with, and is an integral element of, a host device or host 104, which may also be a subsystem or system. A host interface or input interconnect 106 links the ASIC to the host device 104 for the purpose of transmitting data signals to ASIC 102. In one embodiment, the host interface is a switch which may be a crosspoint switch.

Processing unit 100 includes a plurality of programmable elements, of which elements 108, 110 and 112 are exemplary. In one embodiment, elements 108-112 primarily perform matrix operations or matrix-intensive mathematical algorithms. As such, these elements may be referred to as programmable matrix elements or "PMEs." The input and output protocol for each PME 108-112 is a standard input/output ("I/O") format for digital signal processing. In particular, as discussed in greater detail below, the input may be either a "0"

or a "1," as per a standard digital signal scheme. Further, one standard output is transmitted from each PME 108-112 to a host output interconnect 114, which may also be a crosspoint switch.

Each PME, e.g. PME 108, may include eight two-stage processing modules or PME dual-stage subchips ("PMEDs"), of which PMEDs 116, 118, 120, 122, 124, 126, 128 and 130 are exemplary. Further, each PME 108-112 includes a multiplicity of bundled functions to include Reset/Enable, Host, Output Formatter, and SP0/SP1 multiplexing functions housed within a single module, which may be designated "PME Other" (reference numeral 210, FIG. 2).

PMEs 108-112 are reconfigurable, which is to say each may be programmed or reprogrammed to perform one or more processing functions related to matrix operations. Each PME 108-112 may be programmed to function independently or in conjunction with other PMEs. Also, functions within each PME 108-112 may be performed in parallel, without many of the limitations of serial data processing. In particular, serial processing or functioning may be used exclusively to monitor and control processes, as opposed to impacting data transfer and flow. As such, processing unit 100 is a flexible processor capable of being operated as one large parallel processor, multiple parallel processors, or as a number of independent processors.

PMEs 108-112 are clocked using a System Clock (not shown). In one embodiment, clock rates up 62.5 MHz shall be accepted, however, it can be appreciated that various clock rates may also be used without departing from the scope of this disclosure. Also, each PME 108-112 can be reset and/or enabled/disabled using a PME level reset or enable control bit respectively. Operationally, the response to the assertion of a "disabled" state for a given PME 108-112 shall be functionally identical to the assertion of the PME "reset" state, with the exception that no internal host modules shall be affected.

Figure 2:
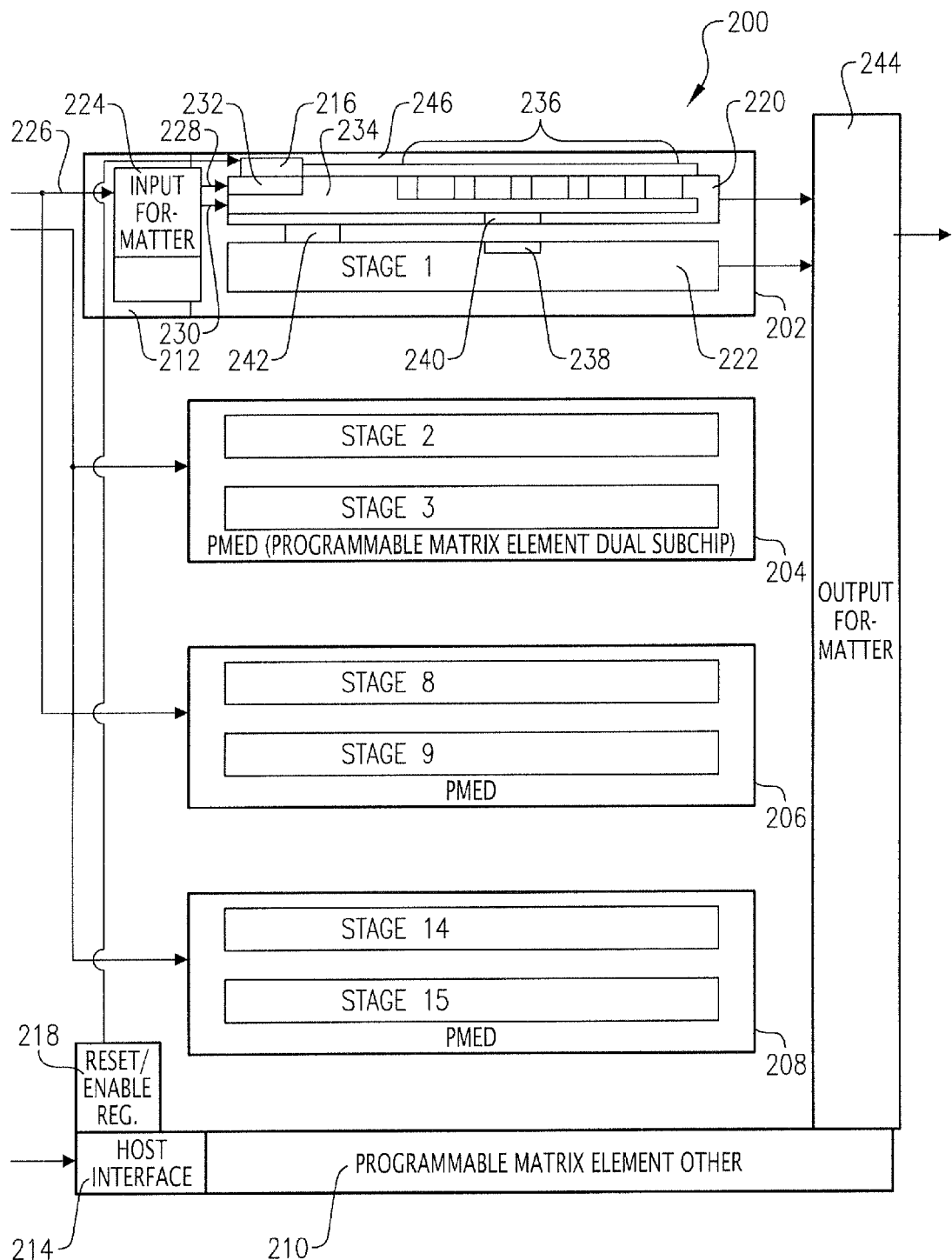
FIG. 2 is a plan view a programmable element.

Referring now to FIG. 2, a somewhat more detailed examination of a programmable element, i.e. PME 200, is disclosed. Although a general overview of a PME 200 and two-stage PMED 202 is provided in FIG. 2, as part of the overall architecture of element 200, a more detailed description of a two-stage PMED is discussed with regard to FIG. 3. The circuitry interconnecting the various components of PME 200 has been simplified to facilitate discussion and explanation. It can be appreciated by those skilled in the art that standard integrated circuit inputs and outputs, as well as circuit interconnects, synchronization and clock signals, etc, are integral to PME 200, and are therefore incorporated into the present disclosure. Only those standard features necessary to understand the disclosed invention are included in the associated figures.

As shown and discussed above, PME 200 includes a plurality of multi-stage processing modules or PMEDs, of which PMEDs 202, 204, 206 and 208 are exemplary. In a PME having eight such modules, PMEDs 202-208 represent one-half of the PMED set of eight. Each stage of each PMED, as well as the PME Other module 210, includes a separate Host Interface, such as host interface 212 (PMED 202 host interface) and interface 214 (PME Other 210 host interface). The PMED host interface modules, e.g. module 210, provides control registers, memory access, and interrupt management functions for each stage.

Similar to each PME, e.g. PME 200, each PMED 202-208 includes a PMED reset and PMED enable/disable function. Through the reset/enable registers, for example register 216, each PMED may be independently reset and enabled/disabled. PMED reset/enable register 216 is interconnected to a PME reset/enable register, e.g. register 218. Additionally, each stage of each PMED may be independently reset or enabled/disabled through a stage reset/enable register (not shown).

In at least one embodiment, each PMED 202-208 is a two-stage module, for example Stage 0 220 and Stage 1 222 in PMED 202. Numbering of stages may be by convention well known in the art. For example, the remaining stages of FIG. 2 may be identified as stages 2 and 3 (PMED 204), stages 8 and 9 (PMED 206) and stages 14 and 15 (PMED 208). Of note, each PMED 202-208 has an "even" and an "odd" numbered stage for each stage "pair," which is used to facilitate the transfer and processing of input signals. Given that FIG. 2 represents one-half of an eight-stage PME, other stage pairs not represented may be numbered, for example, (4,5), (6,7), (10,11), (12,13).

Each stage of a PMED, e.g. Stage 0 220 and Stage 1 222 of module 202, is interconnected to a stage signal input formatter, such as input formatter 224. Each stage input formatter is structured and arranged to demultiplex a standard input signal 226 into two discrete signals streams or input signals, e.g. signals 228 and 230. Signals 228 and 230 are communicated within Stage 0 220 to an interpolation module 232 and a crosspoint switch 234 respectively.

Interconnected to crosspoint switch 234 are a series of signal manipulation modules 236 for performing certain designated matrix/mathematical functions and/or data control/transfer on data integral to and derived from input signal 226. As described in greater detail below, functions include addition, subtraction, division, etc. of real and complex numbers. Further, each stage includes Type "0" generic RAM modules (e.g. modules 238 and 240), and a Type "1" generic RAM modules, e.g. module 242. Also, PME 200 includes a PME Output formatter 244 interconnected to each stage (e.g. Stage 0 220), and a PME Programmable Control Module ("PGCM") 246.

Figure 3:
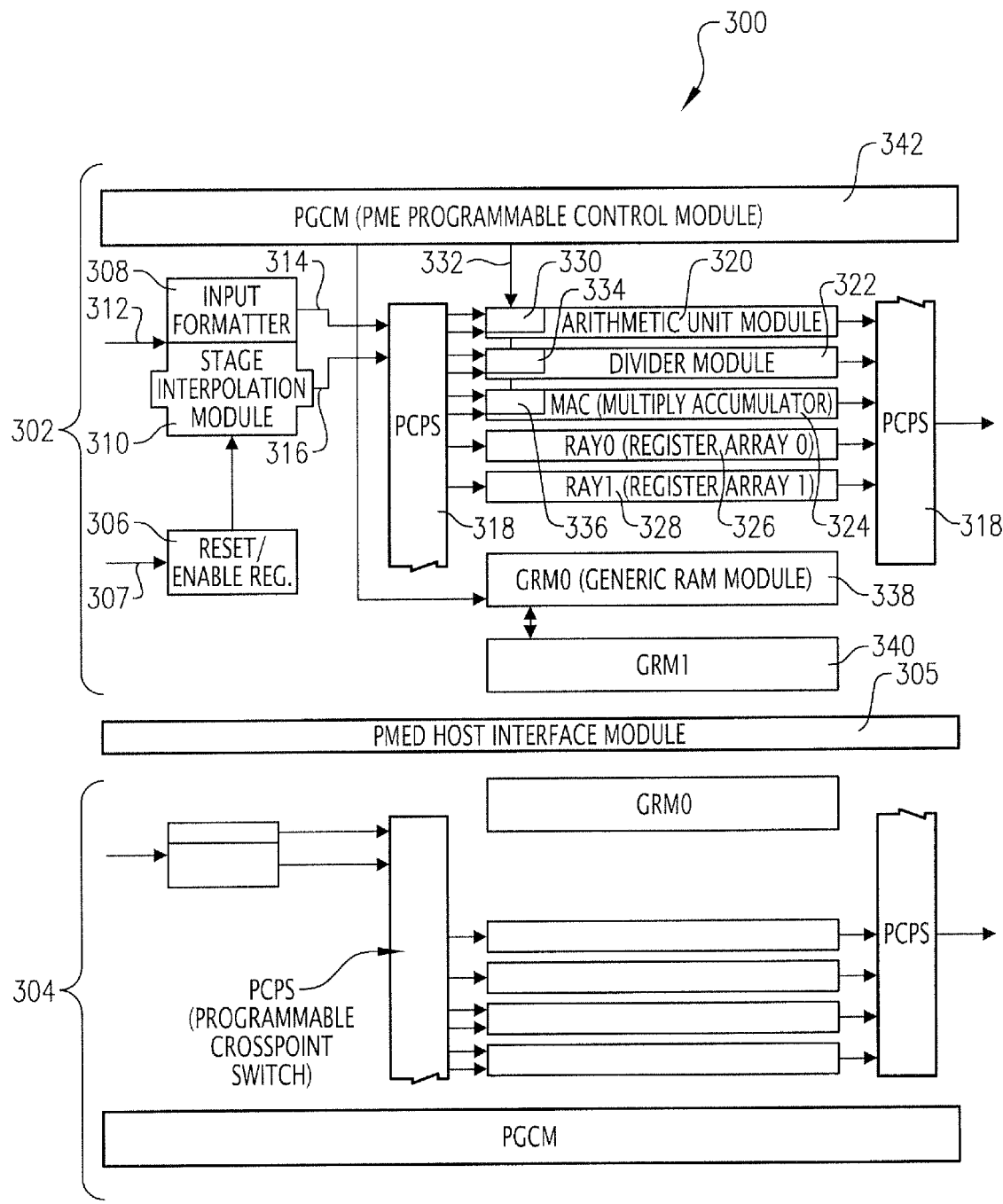
FIG. 3 is a plan view of multi-stage signal processing unit.

Considering now FIG. 3, a more detailed examination of a PMED 300 is presented. As shown, each PMED 300 includes two stages, for example a Stage 0 302 and a Stage 1 304, as well as a host interface 305. In a PME having eight two-stage PMEDS, each stage 1-15 is capable of performing substantially the same functions. One stage, typically identified by convention as Stage 0 302, includes additional functional capability. More specifically, in addition to the input formatting, interpolation, addition, subtraction, multiplication, accumulation, storage and scaling of both complex and real numbers provided by stages 1 through 15, Stage 0 302 includes a complex/real number division function.

A stage reset/enable register 306 (Stage 0 302) may receive a control signal or command 307 from the PMEDs reset/enable manager (e.g. register 216 FIG. 2) to reset, enable or disable Stage 0. Reset/enable register 306 has the capability to reset, enable or disable Stage 0 302 independent of any reset, enable or disable function performed on any other stage, e.g. Stage 1 304. After reset, a stage is left in a "disabled" state and all related programming registers assume their default values.

The same may be said for the assertion of a "disable" command from register 306, with the exception that the corresponding PMEDs Host Interface Module 305 is not affected by the stage "disable" command. When a stage such as Stage 0 302 is enabled, the corresponding PMEDs host interface provides for a readback of the stage enable status.

Within each stage, an input formatter 308 and stage interpolation module 310 receive a single input signal 312 and output two (18,18) signals 314 and 316 respectively to a stage crosspoint switch module ("PCPS") 318. Stage input formatter 308 has the capability to route a "data valid" signal from each channel in a standard multiplexed input signal 312 to any of the signal streams being created by within a PME (e.g. PME 200 FIG. 2). Upon receipt of a "data valid" signal derived from the multiplexed input signal 312, the stage shall reset/enable stage input formatter 308 via enable/reset register 306.

As discussed briefly above, each PME/PMED/Stage may receive both input signal "0" and an input signal "1." Stage interpolation module 310 provides input interpolation for each stage input signal "1." The output is an "interpolated" signal "0." In particular, interpolation is accomplished by inserting an indicated number of "zeroes" after each input signal "1" sample received. The number of "zeroes" inserted is controlled by an interpolation field of an interpolation control register within stage interpolation module 310. If an indicated interpolation produces a sample rate exceeding the System Clock rate, an "interpolator error" interrupt signal is generated.

The outputs 314, 316 of the Stage 0 302 input formatter 308 and stage interpolation module 310 are directed toward the stage crosspoint switch module 318. As an integral part of the present disclosure, PCPS 318 interconnects the signal processing resources within Stage 0 302. As shown in FIG. 3, the specific resources include: an arithmetic unit module ("AU") 320; a divider module 322; a multiply/accumulate module ("MAC") 324; and two register array modules ("RAY"), i.e. RAY "0" 326 and Ray "1" 328.

In at least one embodiment, AU module 320 accepts two (24, 24) standard inputs (typically represented as Input 0 and Input 1) from PCPS 318, and provides one (24,24) standard output to PCPS 318. A "sample hold" function 330 within AU module 320 one or more control bits from a PCPS control bus 332 to determine its mode of operation. In a "normal" hold mode, an AU module 320 operation may only be performed when valid values are present at both inputs (i.e. Input 0 and Input 1). Values received at each input may be held until they are used in an AU operation and then released. Sample hold function 330 is capable of accepting values at the System Clock rate. If a new value is received on the same input before an AU operation occurs, the old value is overwritten. An "AU Hold Error" interrupt is generated for this condition. In a "latched" hold mode, sample hold function 330 may latch the next valid value received, and hold the value until the mode of AU module 320 is changed. AU operations occur any time both inputs to the module are valid.

AU module 320 may be capable of performing complex addition and subtraction operations at System Clock rates. For addition, an Output=Input 0+Input 1. Alternatively, for subtraction, an Output=Input 0−Input 1. AU module 320 receives a single control bit to determine whether the module adds or subtracts. AU module 320 is capable of switching modes at System Clock rate. If a numeric overflow occurs, an "AU Overflow Error" interrupt may be generated.

Figure 6:
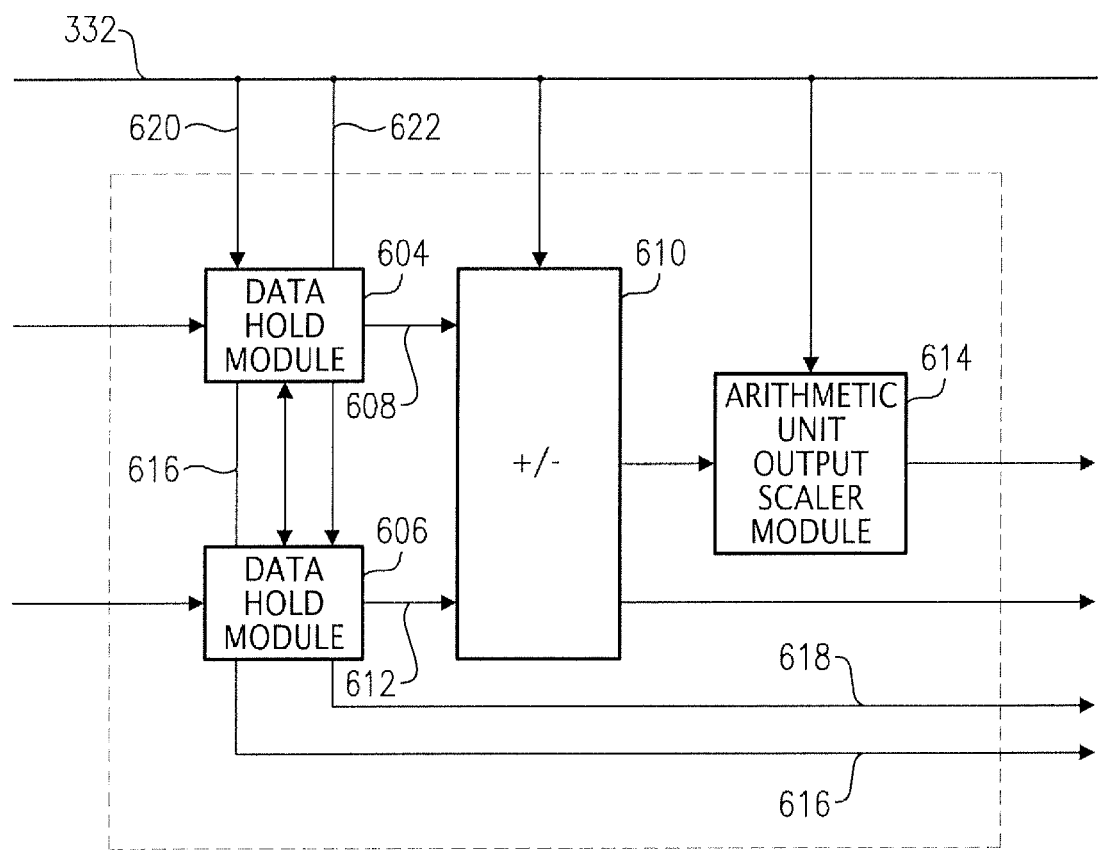
FIG. 6 is an exemplary circuit for implementing a sample hold function of a mathematical operation module of the signal processing unit of FIG. 3.

Referring to FIG. 6, the AU module 320 may include exemplary circuit 602. The sample hold function 330 (FIG. 3) is implemented in the circuit 602 with two data hold modules 602,604. A first data hold module 604 receives data from the PCPS 318 and communicates the data to a first input 608 of an arithmetic module 610. A second data hold module 606 receives data from the PCPS 318 and communicates the data to a second input 612 of the arithmetic module 610. The arithmetic module 610 is an exemplary mathematical operation module that may be replaced with other mathematical operation modules. The circuit 602 includes an AU Output Scaler Module 614.

The first data hold module 604 communicates a first data valid signal to the second data hold module 606 upon receipt of first valid data from the PCPS 318, and the second data hold module 606 communicates a second data valid signal to the first data hold module 604 upon receipt of second valid data from the PCPS 318. The first data hold module 604 communicates the first valid data to the first input 608 upon receipt of the first valid data and the second data valid signal. The second data hold module 606 communicates the second valid data to the second input 612 upon receipt of the second valid data and the first data valid signal.

The first data hold module 604 may include a first error output 616 asserted if the first hold module 604 receives third valid data after receiving the first valid data and before communicating the first valid data to the first input of the add/subtract module 610. Similarly, the second data hold module 606 may include a second error output 618 asserted if the second hold module receives fourth valid data after receiving the second valid data and before communicating the second valid data to the second input of the mathematical operation module.

Each of the data hold modules 604,606 receives a control signal 620,622 from the PCPS control bus 332. Each of the control signals 620,622 may be, for example, one bit, wherein a first state of the signal corresponds to the "normal hold" mode of operation and a second state of the signal corresponds to the "latched hold" mode of operation. The PCPS control bus 332 is controlled by a programmable PME control module ("PGCM"), which in turn is controlled by the host 104, as explained below in greater detail.

While the circuit 602 includes an arithmetic module 610 for use in the AU module 320, it will be appreciated that the arithmetic module 610 is exemplary in nature and that the circuit 602 is adaptable for use in the divider module 322 and the MAC module 324.

As noted above, only one stage (e.g. Stage 0) includes a complex/real number Divider module 322. Divider module 322 accepts two (24, 24) standard inputs (typically represented as Input 0 and Input 1) from PCPS 318, and provides one (24,24) standard output to PCPS 318. A "sample hold" function 334 within Divider module 322 receives a single control bit from a PCPS control bus 332 to determine its mode of operation. The sample hold function 334 may be implemented in substantially the same manner as the sample hold function 330 described above. In a "normal" hold mode, a Divider module 322 operation may only be performed when valid values are present at both inputs (i.e. Input 0 and Input 1). Values received at each input may be held until they are used in a Divider operation and then released. Sample hold function 334 is capable of accepting values at the System Clock rate. If a new value is received on the same input before a Divider operation occurs, the old value is overwritten. A "Divider Hold Error" interrupt is generated for this condition. In a "latched" hold mode, sample hold function 334 may latch the next valid value received, and hold the value until the mode of Divider module 322 is changed. Divider operations occur any time both inputs to the module are valid. Divider module 322 may be capable of performing complex/real division operations at System Clock rates, and may be capable of switching modes at System Clock rate as well.

In addition to an AU module 320 and Divider module 322, each stage may include a MAC module 324. MAC module 324 typically includes multiplier, accumulator and output scaler modules (not shown). MAC module 324 accepts two (24,24) standard inputs from PCPS 318 and provides one standard (24,24) output to PCPS 318. MAC module 324 is capable of both real and complex number multiplication. A "sample hold" function 336 within MAC module 324 receives a single control bit from a PCPS control bus 332 to determine its mode of operation. The sample hold function 336 may be implemented in substantially the same manner as the sample hold function 330 described above. In a "normal" hold mode, a MAC module 324 operation may only be performed when valid values are present at both inputs (i.e. Input 0 and Input 1). Values received at each input may be held until they are used in an AU operation and then released. Sample hold function 336 is capable of accepting values at the System Clock rate. If a new value is received on the same input before a MAC operation occurs, the old value is overwritten. A "MAC Hold Error" interrupt is generated for this condition. In a "latched" hold mode, sample hold function 336 may latch the next valid value received, and hold the value until the mode of MAC module 324 is changed. MAC operations occur any time both inputs to the module are valid.

The multiplier module within MAC module 324 may have four modes of operation: Single Real; Dual Real; Complex; and Complex Conjugate. The multiplier module within MAC module 324 receives two "Mode Control" bits to determine its mode of operation. As with other elements of the present disclosure, the multiplier module is capable of switching mode at System Clock rates. Of note, if a multiplication operation is "in process," the operation will complete prior to a mode change.

The Accumulator module (not shown) within MAC module 324 is capable of performing complex addition at the System Clock rate. The accumulator function can automatically add together a programmed number of complex MAC Adder inputs, output the sum, and then clear the accumulation sum. Three modes of accumulation include: single accumulation; multiple accumulation; and adder bypass. Single accumulation mode zeros the accumulation sum, adds together a predetermined number of MAC 324 multiplication products, and then outputs the accumulation sum. The multiple accumulation mode maintains four independent single accumulations by demultiplexing four adjacent input values. Further, adder bypass mode forces a zero on an adder input used for an accumulation feedback path, thereby causing the MAC Adder function to be bypassed.

Programmable scaling of MAC module 324 output is achieved via a MAC scaler output module (not shown). Scaling is accomplished via a barrel shift function. The amount of scaling is controlled, and all outputs are rounded to 24-bits. The output scaler module is capable of operating at the System Clock rate.

Still referring to FIG. 3, each PMEDs stage may provide two Register Array ("RAY") modules designated modules "0" and "1," e.g. modules 326 and 328 respectively. Each RAY module 326, 328 accepts one standard (24,24) input from PCPS 318 and provides one (24,24) standard output to PCPS 318. Further, each RAY module 326, 328 contains sixteen (24,24) registers. Three separate modes of operation are possible, including: "linked datapipe source"; "ping-pong", and "incremental feedback" modes.

In "linked datapipe source" mode, a given RAY accepts a burst of input data at up to the System Clock rate, and then outputs the data stream at the same or a slower rate. Each successive input shall be written into one of the registers at the rate received. An output read sequence may be initiated each time the initial register is written to. If data in a register is overwritten before it is output, or if the read sequence cannot complete in a timely manner due to a lack of data input, the a "RAY Error Interrupt" is generated.

When placed in the "ping-pong mode" of operation, the 16 RAY registers of a given RAY are divided into two 8-register banks, known by convention as "A" and "B" banks. One register bank is available for writing by the Host and one is available for reading to the RAY output. Typically, relative addressing of registers as "0" to "7" in each bank is maintained. Read sequences in process when the "ping-pong" control bit is changed are completed before the register bank is switched. Further, switching register banks may cause both read and writer pointers to be reset.

In the "incremental feedback mode" of operation, a RAY accepts a series of inputs. Each successive input is written to one of the RAY registers. A "cumulative" read buffer is maintained such that every input since the beginning of a write sequence is output from the RAY, in the order received, in response to each write.

As shown in FIG. 3, each PMED 300 may include two Type 0 Generic RAM modules ("GRM0"), for example, module 338 for Stage 0 302. The PME Other module (210 FIG. 2) interconnects the sixteen GRM0 modules present in a given PME 200 to provide a Scratchpad RAM 0 (SP0) function. In a given PMED 300, the SP0 function provides a standard (24,24) interface to/from each of sixteen PCPSs (e.g., PCPS 318). Via SP0 write ports, any PCPS 318 can supply data to any GRM0 338, and alternatively, any GRM0 338 can supply data to any PCPS 318 via a SP0 read port. In at least one embodiment, each GRM0 module, e.g., module 338, includes eight operational modes, i.e. Host; RCB; Normal Datapipe Source; Signal Triggered Datapipe Source; Datapipe Destination; Extended Precision Datapipe Destination; Type 1 FIR Filter ISM; and Type 2 FIR Filter ISM.

Figure 7:
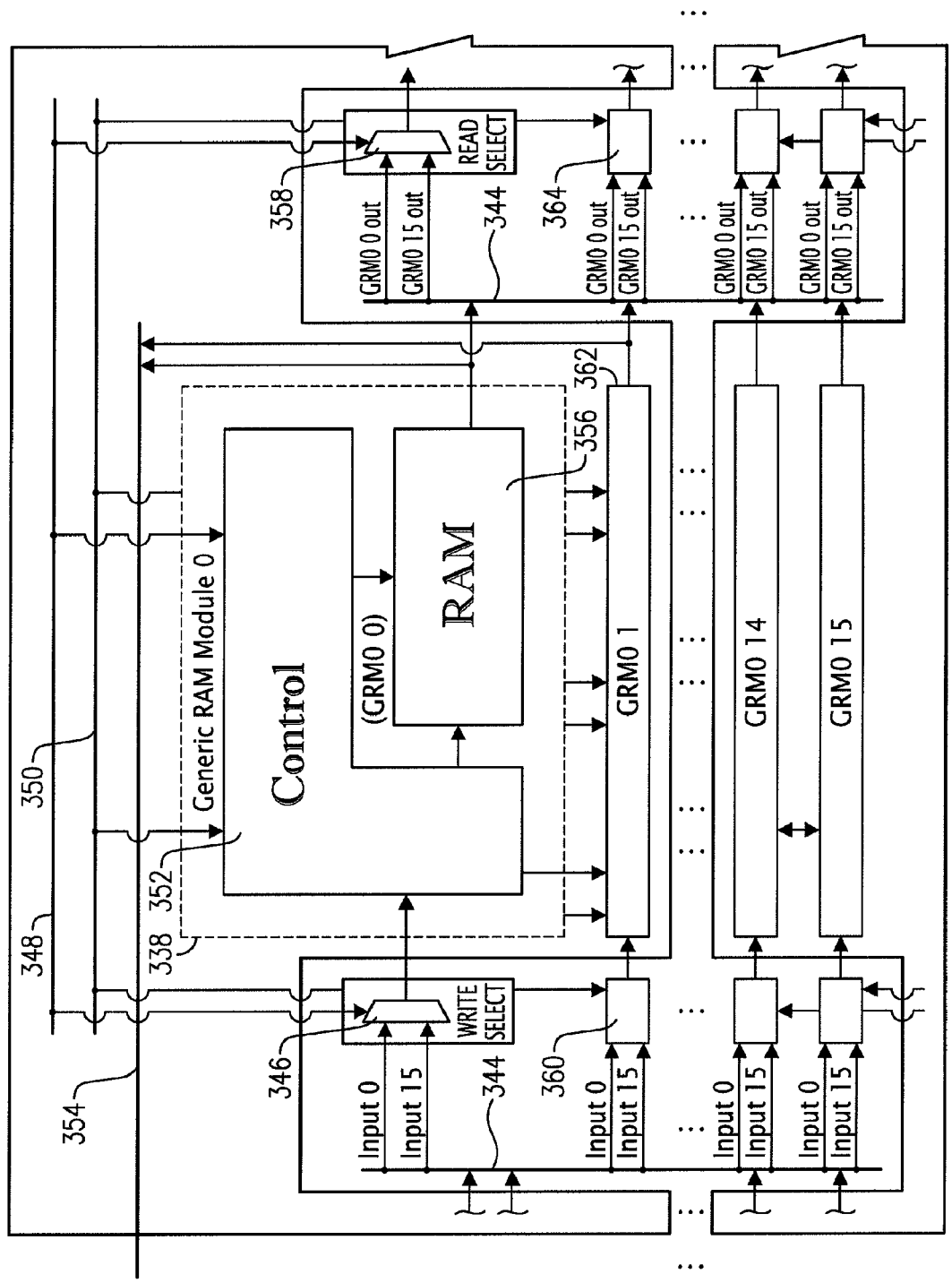
FIG. 7 is an exemplary circuit for implementing a generic RAM module of the signal processing unit of FIG. 3.

FIG. 7 illustrates an exemplary implementation of the scratchpad RAM 0 function. As explained above, the scratchpad RAM 0 function is implemented using the GRM0 modules of a plurality of PMEDs. The scratchpad functionality of PMED 202 is illustrated in detail in FIG. 7, with the understanding that other PMEDs, including PMED 208, may operate in substantially the same manner as PMED 202. The PMED 202 can write data to the GRM0 of any PMED by communicating write data to an interconnect bus 344 via a data output port. As illustrated, the interconnect bus 344 is in communication with each of the plurality of PMEDs. First selection circuitry 346 selects data from the interconnect bus 344 and communicates the selected data to the GRM0 module 338. The data selected from the interconnect bus 344 may have originated from any of the PMEDs. First and second RAM control busses (RCBs) 348,350 are in communication with the selection circuitry 346 and a RAM control module 352. The RCBs 348,350 are controlled by the PGCM 342, which in turn is programmed by the host 104. A host interface 354 communicates a host control signal and host data to the control module 352.

The RAM 356 communicates stored data to the interconnect bus 344. Second selection circuitry 358 selects data from the interconnect bus 344 and communicates the selected data to an input of the PMED, such as the PCPS 318. Third selection circuitry 360 selects data from the interconnect bus 344 and communicates the selected data to the GRM0 1 module 362, and fourth selection circuitry 364 selects data from the interconnect bus 344 and communicates the selected data to an input of the PMED, such as the PCPS 318. Third selection circuitry 360 and fourth selection circuitry 364 may be substantially similar to first selection circuitry 346 and second selection circuitry 358, respectively, and are controlled by RCBs 348,350. The GRM0 1 module 362 includes RAM and a control module (not shown), the control module being substantially similar to control module 352.

As explained above, the GRM0 338 may operate in one of a plurality of modes according to the host and RCB control signals. In the Host mode, the host interface has read/write access to each GRM0 as a single, continuous address space.

For complex numbers, even Host addresses may contain "in-phase" values and odd addresses may contain "quadrature" values.

Figure 8:
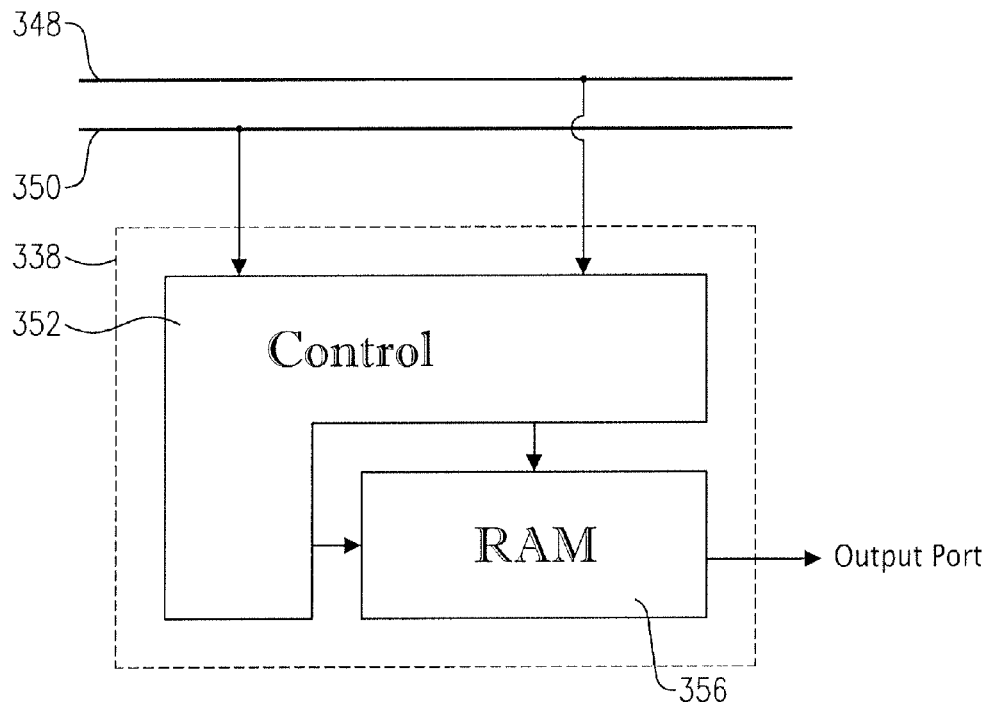
FIG. 8 is a block diagram of a portion of the circuit of FIG. 7 depicting a first mode of a memory element.
Figure 9:
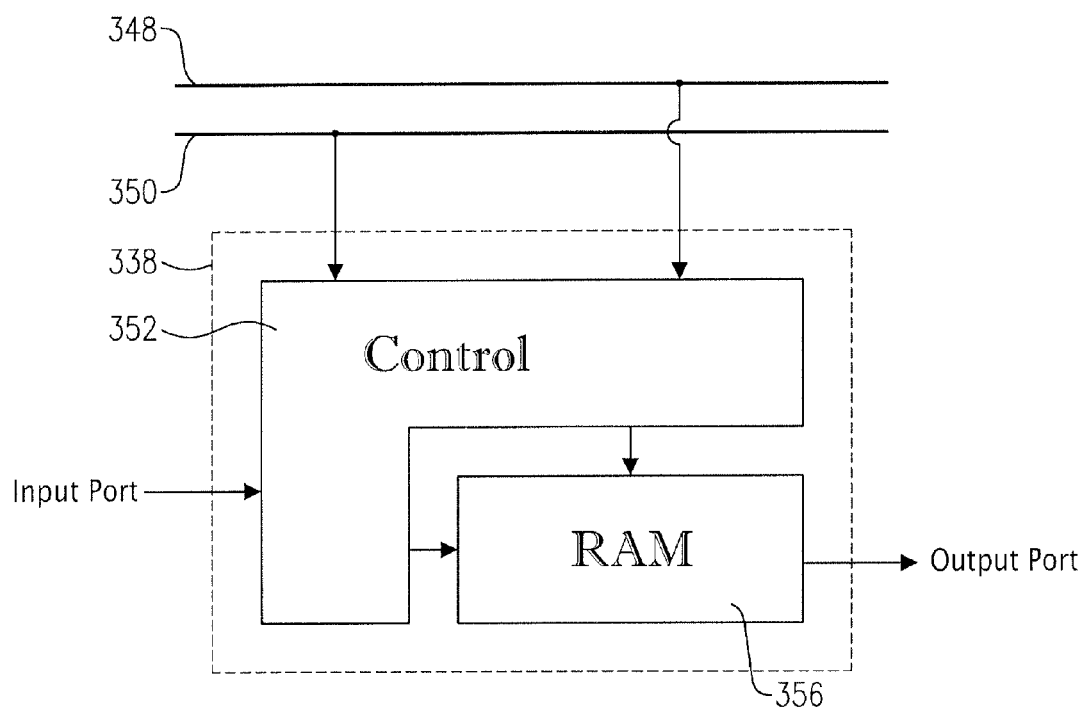
FIG. 9 is a block diagram of a portion of the circuit of FIG. 7 depicting a second mode of the memory element.

In RCB mode, each GRM0 is directly controlled by the RCB of the associated PGCM 342. When placed in the datapipe source mode of operation, each GRM0 automatically reads from memory to the RCB-selected output port. In normal datapipe source mode, each GRM0 reads from memory to the RCB-selected output port when the address control register is written to, as shown in FIG. 8. In signal triggered datapipe source mode, each GRM0 reads from memory to the RCB-selected output port when a data valid signal is received on the RCB-selected input port, as shown in FIG. 9. RAM read cycles are controlled by the GRM0 read address generator (GRM0RAG).

Figure 10:
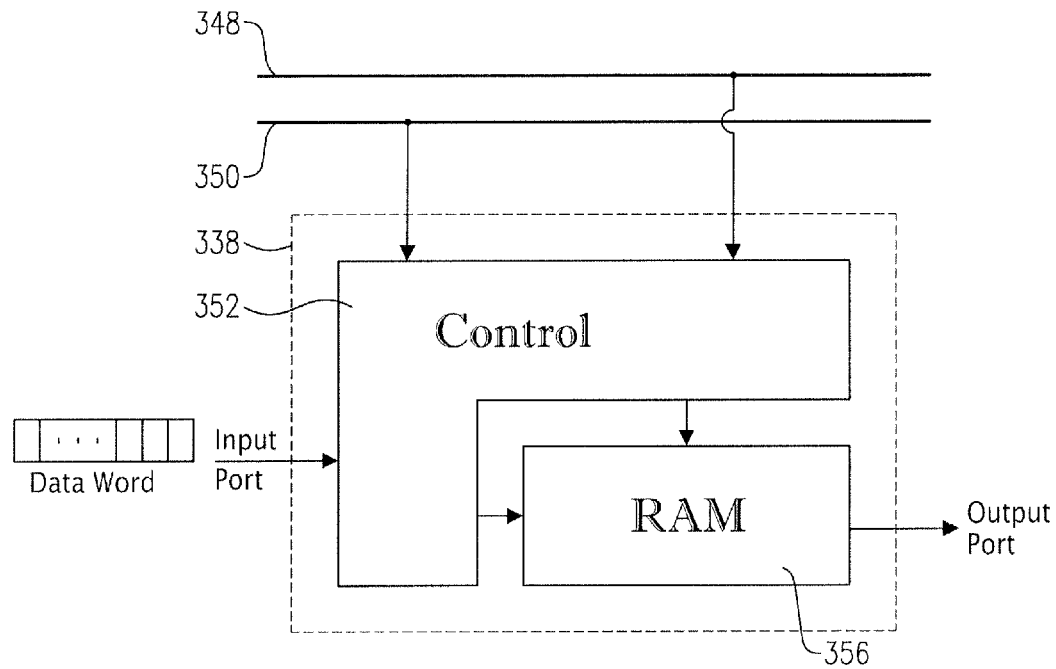
FIG. 10 is a block diagram of a portion of the circuit of FIG. 7 depicting a third mode of the memory element.
Figure 11:
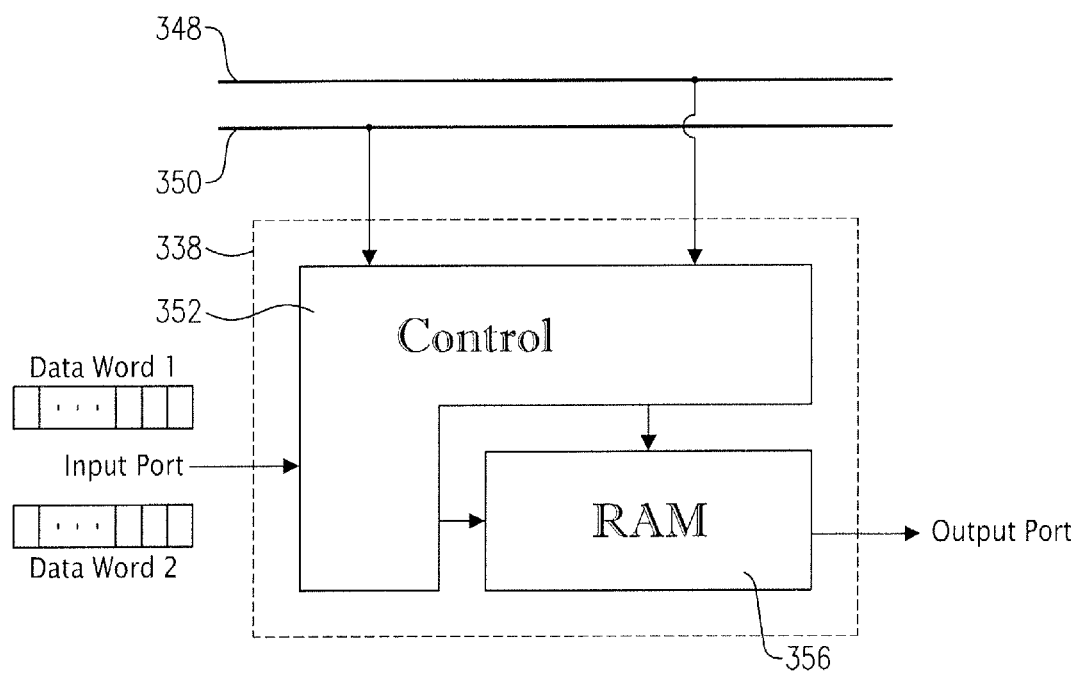
FIG. 11 is a block diagram of a portion of the circuit of FIG. 7 depicting a fourth mode of the memory element.

In datapipe destination mode, each GRM0 automatically writes data on an RCB-selected input port to memory, as shown in FIG. 10. In extended precision datapipe destination mode, each GRM0 supports a packed input format, allowing a data word to be written from an RCB-selected input port to memory where the data word is larger than the input port. In this mode, a portion of a first data value received at the input port is combined with a portion of a second data value received at the first input port to form the extended word, as shown in FIG. 11.

In an exemplary implementation, each input port may be 36 bits wide, including an 18 bit in-phase ("I") portion and an 18 bit quadrature ("Q") portion (referred to herein as an "18,18" value). In the datapipe destination mode, each GRM0 automatically writes an 18,18 value from an RCB-selected input port to memory. In the extended precision datapipe destination mode, a GRM0 may store a 24,24 word comprising portions of a first 18,18 input value and a second 18,18 input value. A first 18,18 input value may carry bits 23-18 of a 24 bit "I" word in bits 5-0 of the "I" portion of the 18,18 input value, and may carry bits 17-0 of the 24 bit "I" word in bits 17-0 of the "Q" portion of the 18,18 input value. A second 18,18 input value may carry bits 23-18 of the 24 bit "Q" word in bits 5-0 of the "I" portion, and may carry bits 17-0 of the 24 bit "Q" word in bits 17-0 of the "Q" word.

Referring to FIG. 3 and FIG. 7, each PMED 300 may include a Type 1 Generic RAM module ("GRM1") 340. The PME Other module (210 FIG. 2) interconnects the eight GRM1 modules present in a given PME 200 to provide a Scratchpad RAM 1 (SP1) function. The SP1 may function substantially the same as the SP0, described above. In a given PMED 300, the SP1 function provides a standard (24,24) interface to/from each of sixteen PCPSs (e.g. PCPS 318). Via SP1 write ports (not shown), any PCPS 318 can supply data to any GRM1 340, and alternatively, any GRM1 340 can supply data to any PCPS 318 via a SP1 read port (not shown). In at least one embodiment, each GRM1 module, e.g. module 340, includes eight operational modes, i.e. Host; RCB; Normal Datapipe Source; Signal Triggered Datapipe Source; Datapipe Destination; Extended Precision Datapipe Destination; Type 1 FIR Filter ISM; and Type 2 FIR Filter Coefficient Address Generator. To allow multi-stage operation, each GRM1 340 is able to transfer data to/from any SP1 port. Also, each GRM1 340 is provided to both stages in a given PMED 300.

As noted above, each PMED 300 includes a Programmable PME Control Module ("PGCM") 342 (Stage 0 302). The function of each PME stage is programmed and controlled by the Host (not shown) via a RAM-based finite state machine which is the PGCM 342. Each PGCM 342 has the ability to execute a user-supplied program at the System Clock rate. Further, each PGCM 342 provides a program storage capacity of 512 instructions. The PGCM 342 program supports a given signal processing function by controlling the arithmetic, storage and signal routing assets of it's the associated stage. Each PGCM 342 can operate independently to control single-stage functions, or it may operate in conjunction with other stages to make multi-stage functions.

Figure 4:
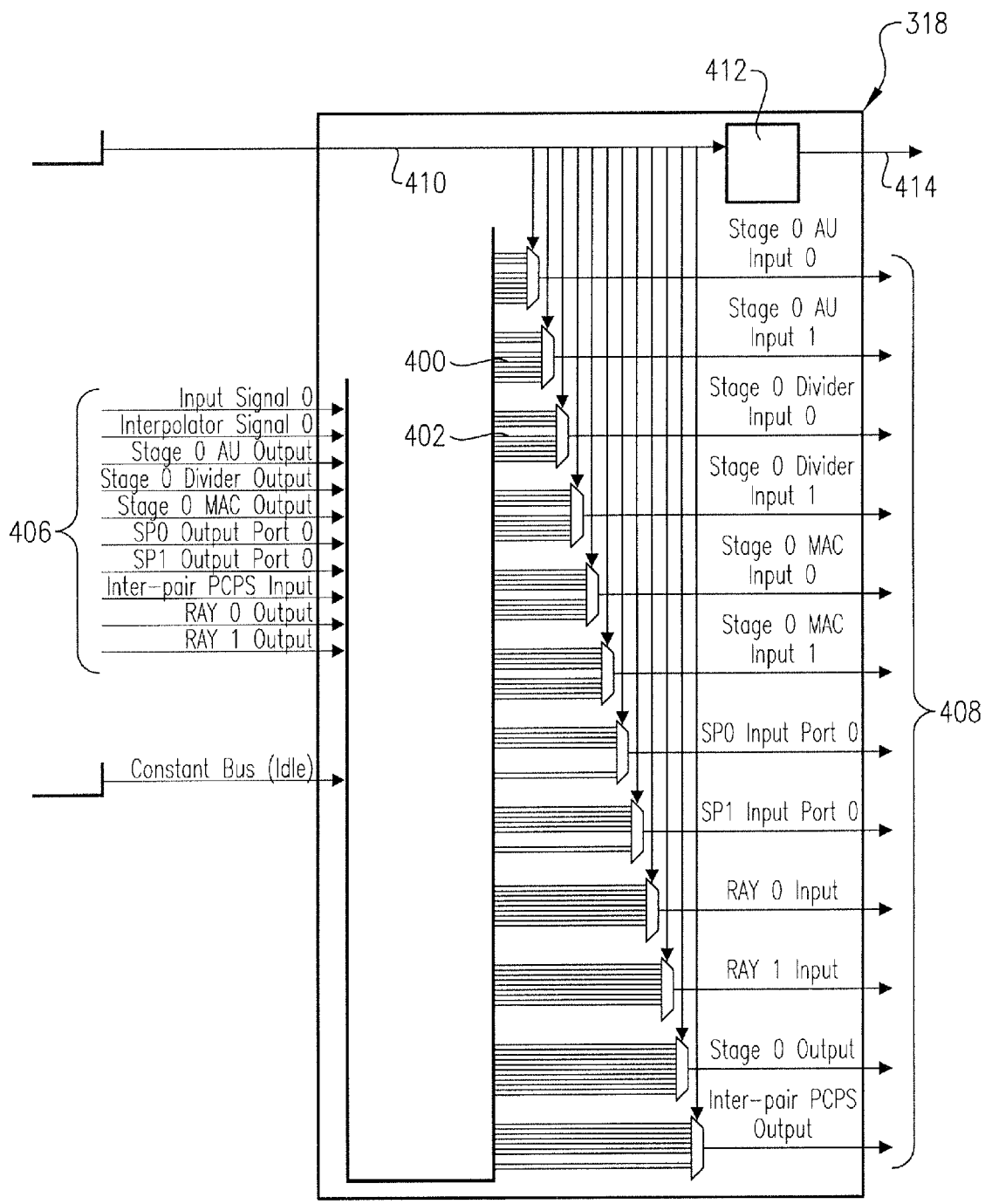
FIG. 4 is a block diagram of a crosspoint switch.

Cross-referencing FIG. 3 with FIG. 4, typical connections for PCPS 318 are presented. As can be appreciated by referring to FIGS. 3 and 4, PCPS 318 is not multiplexed, which is to say signal streams are passed directly between stage resources. Crosspoint switch 318 may be programmed to interconnect arithmetic elements (e.g. AU module 320, MAC module 324) in "datapipe" fashion. A PGCM 342 directs the data flow process without directly interfering with data transfers affected by crosspoint switch 318.

As shown in FIG. 4, a specified number of parallel data pathways, or "datapipes" are available for the transfer of data, of which pathways 400 and 402 are exemplary. Representative input signals 406 are routed via datapipes (e.g., 400 and 402) to any one of several signal output locations 408. During operation, each destination or data pathway in PCPS 318 shall have its source selected by 4-bits from the PCPS control bus 410, which in turn is provided by the associated PGCM, e.g. PGCM 342 in FIG. 3. If an indicated connection is not valid (block 412 in FIG. 4), an "Invalid PCPS Connection Error" interrupt will be generated 414. In at least one embodiment, PCPS 318 is capable of switching connections at the System Clock (not shown) rate.

Typically, pathways 400, 402 in PCPS 318 carry a 24-bit in-phase word and a 24-bit quadrature word (24,24). PCPS 318 interconnections where the source and destination have the same bit width are mapped bit-to-bit. Alternatively, PCPS 318 interconnections where the source and destination have a different bit width are mapped as follows: (a) 18-bit sources are sign-extended into the LS bits of internal 24-bit PCPS 318 destinations thereby allowing for maximum growth for subsequent manipulations of 18-bit numbers; (b) 18-bit sources connected to a 24-bit output formatter destination are optionally mapped MS-bit to MS-bit, with any extra bits zero-filled, such that a given input value will produce the same output value if a direct connect is used; (c) certain modules, such as the MAC 324 and Divider 322 modules, having internal bit resolution greater than 24-bits, may have output scaler functions which allow the desired 24-bits to be selected for output in a given functional application; and, similarly, (d) AU module 320 has an output scaler function which allows an 18-bit output to result from either the MS or LS part of a 24-bit word. For all other 24-bit sources it may be assumed that the "best" 18-bits are the MS bits of the 24.

Interconnection options within PCPS 318 may be controlled and/or restricted to minimize hardware requirements. For example, stage "input" and "interpolation" sources may be available to all destinations (modules, etc.) within a given stage. Similarly, stage "outputs" may have all sources within the same stage available to it. Referring for a moment to FIG. 5, a sample stage-by-stage summary of valid PCPS sources and destinations for at least one embodiment of the present disclosure is presented. In FIG. 5, the numbers (i.e. "0" and "1") in the stage columns labeled "0" and "1" 500 are used in place of the "x" variable for each source and destination. For example, "Stage x Input Signal" for Stage "0" (indicated by arrow 502) would be "Stage '0' Input Signal." Alternatively, "Inter-pair Input from Stage x" for Stage "0" (indicated by arrow 504) would be "Inter-pair Input Stage 1."

As shown in FIG. 5, there may be several asymmetries in the resource allocations for various stages. For example, in at least one embodiment Stage 0 is the only stage to include a stage divider module, therefore there can be no Stage 1 Divider Output source, nor can there be a Stage 1 Divider Input 0 or Input 1. Also, inter-pair connections may only be cross-linked between the stages of each pair of stages. Further, although each stage in a pair may drive an SP1 Write Port (as shown in FIG. 5), only one stage in each pair may actually write to the PMED RAM at any one time. By contrast, both stages of a pair (e.g., Stage 0 and Stage 1) may receive the same SP1 Read Port simultaneously.

Changes may be made in the above methods, devices and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, device and structure, which, as a matter of language, might be said to fall therebetween.

Having thus described a preferred embodiment of the invention, what is claimed as new and desired to be protected by Letters Patent includes the following:

The invention claimed is:

1. A system for data processing comprising:
   a host circuit; and
   an integrated circuit in communication with the host circuit, the host circuit being external to the integrated circuit, the integrated circuit comprising
      a host interface for receiving a host control signal and data from the host circuit,
      a crosspoint switch, and
      a plurality of programmable elements for data processing, each programmable element coupled to the host interface and the crosspoint switch and comprising
         a plurality of memory elements,
         an interconnect bus directly coupled to an output of each memory element,
         an element control module for generating an element control signal and communicating data to an input of a memory element,
         a memory write port for communicating data from the crosspoint switch to the interconnect bus,
         write selection circuitry for receiving data including a write value from all the programmable elements via the interconnect bus and selectively communicating the write value to the element control module according to the element control signal,
         read selection circuitry for receiving data including a read value from all the programmable elements via the interconnect bus and selectively communicating the read value to the crosspoint switch according to the element control signal, and
         a memory control module for controlling operation of the memory element according to the host control signal and the element control signal.

2. The system as set forth in claim 1, the memory control module causing the memory element to selectively operate in one of a plurality of modes according to the host control signal, wherein in a first mode the memory control module causes the memory element to communicate stored data to the memory read port upon receiving the host control signal, and in a second mode the memory control module causes the memory element to communicate stored data to the memory read port upon detecting valid data at the memory write port.

3. The system as set forth in claim 1, wherein the memory control module causes the memory element to selectively operate in one of a plurality of modes according to the host control signal, wherein in a first mode the memory control module causes the memory element to store a first data value consisting of at least a portion of a single data word received at the memory write port, and in a second mode the memory control module causes the memory element to store a second data value consisting of at least a portion of each of two sequentially separate data words received at the memory write port.

4. The system as set forth in claim 3, wherein each data word consists of thirty-six bits, the first data value consists of a single thirty-six bit word, and the second data value consists of twenty-four bits of a first thirty-six bit word and twenty-four bits of a second thirty-six bit word.

5. The system as set forth in claim 1, the element control module being controlled by the host circuit.

\* \* \* \* \*